United States Patent [19]

Omori et al.

[11] 4,002,278
[45] Jan. 11, 1977

[54] METHOD AND APPARATUS FOR FEEDING A FILLER CORD FOR SLIDE FASTENERS

[75] Inventors: Shigenori Omori, Uozu; Isamu Maeda, Kurobe; Fumio Terada, Uozu, all of Japan

[73] Assignee: Yoshida Kogyo Kabushiki Kaisha, Japan

[22] Filed: Aug. 27, 1975

[21] Appl. No.: 608,172

[30] Foreign Application Priority Data

Sept. 5, 1974 Japan .............................. 49-102237

[52] U.S. Cl. .................................. 226/1; 226/182; 242/153
[51] Int. Cl.² ......................................... B65H 17/22
[58] Field of Search ............. 226/1, 168, 182, 186, 226/198; 242/153, 154

[56] References Cited

UNITED STATES PATENTS

| 2,198,695 | 4/1940 | Cummings | 226/182 |
| 3,161,913 | 12/1964 | Pound | 242/153 |
| 3,346,019 | 10/1967 | Brosseit | 242/153 X |

*Primary Examiner*—Richard A. Schacher
*Attorney, Agent, or Firm*—Bucknam and Archer

[57] ABSTRACT

A method and apparatus for feeding a filler cord for insertion into and through a longitudinal space defined by successive convolutions of a coiled slide fastener element, the filler cord being looped in the course of its travel from a bobbin to a mandrel holder so that a proper back tension is imparted to the cord and the cord is supplied at a rate corresponding to the amount of withdrawal of the fastener element that has been shaped into a helical coil.

5 Claims, 2 Drawing Figures

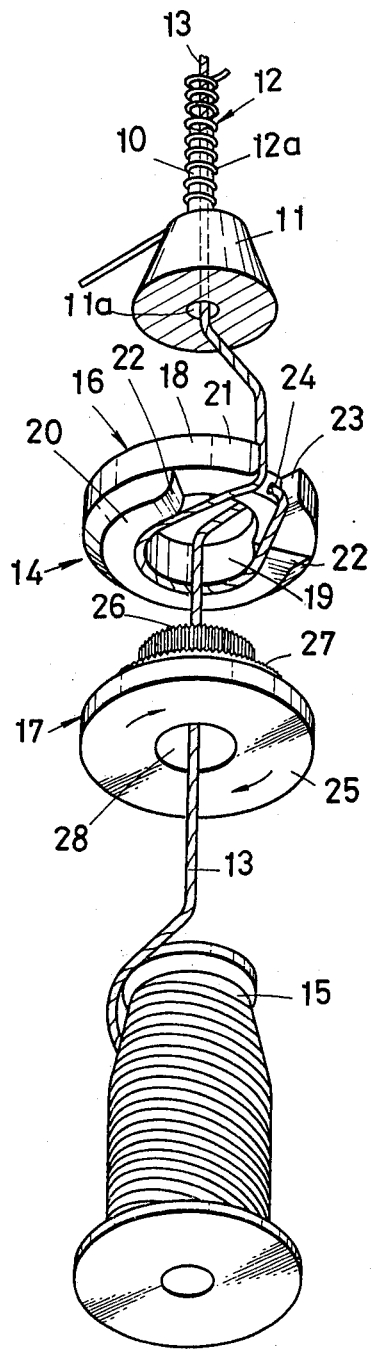
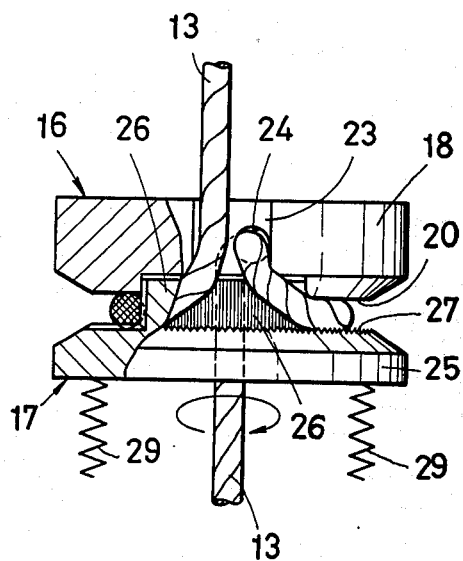

METHOD AND APPARATUS FOR FEEDING A FILLER CORD FOR SLIDE FASTENERS

BACKGROUND OF THE INVENTION

This invention relates to a method of and an apparatus for feeding a filler member or cord with respect to an interlocking element for a slide fastener during the formation of such element.

As is well known in the art of slide fasteners, filler cords usually made of a textile material are employed to assist in retaining the proper position and function of a fastener element such as for example in the form of a continuous helical coil when the latter is secured to a longitudinal edge of the fastener tape. It is known to insert the filler cord into and through the space extending longitudinally of the convolutions of the coil element simultaneously as they are progressively formed and transported.

According to one such known method and apparatus, the filler cord wound on a bobbin is first withdrawn by a swinging or rotating member and further pulled out, while it is somewhat slackened, by means of a rotary screw associated with a fastener element forming and transporting mechanism. When it is fed while being held slack, the cord tends to become irregular in its reversely directed or back tension, hence vary over a given length, become twisted, improperly positioned, deformed or otherwise result in defective fastener products.

SUMMARY OF THE INVENTION

With the foregoing difficulties of the prior art in view, it is the primary object of the present invention to provide an improved method of feeding a filler cord relative to an interlocking element of a slide fastener, which method ensures a constant rate of feed of the filler cord corresponding to the rate of withdrawal of the element as the latter is progressively formed into a coil or other suitable structure, while a constant back tension is imparted to the cord.

Another yet related object of the invention is to provide an apparatus which is designed to carry the above method into practice and which is simple in construction and suitable for mounting compactly in the area closely adjacent the mandrel holder of the element forming machine.

Briefly stated, the method of the invention comprises: withdrawing the filler cord from its source of supply; bypassing the cord around a loop of path during the course of its travel; gripping the cord to maintain movement along said loop of path; and driving the cord at and along said loop at a rate corresponding to the rate at which the interlocking element is formed and advanced. A preferred form of apparatus to carry the above method into practice according to the invention comprises guiding means and rotating means movable towards and away from said guiding means, said guiding means having a downwardly projecting peripheral ridge adapted for guiding the movement of the filler cord in a loop therealong, and said rotating means having a roulette-like gear for frictionally driving the filler cord in sandwiched relation to said guiding means at a rate corresponding to the rate at which the interlocking element is formed and advanced.

The invention will be better understood from the following detailed description taken in connection with the accompanying drawing which illustrates by way of example a preferred embodiment of the invention and in which like reference numerals denote like parts.

BRIEF DESCRIPTION OF THE DRAWINGS

FIG. 1 is an exploded perspective view of a preferred form of apparatus employed in accordance with the invention; and FIG. 2 is a front elevational view, partly broken away, of the apparatus of FIG. 1.

DESCRIPTION OF THE PREFERRED EMBODIMENTS

Referring now to FIG. 1, there is shown a mandrel 10 secured to its holder 11 having a central through-opening 11a communicating with the space defined by progressively formed helical convolutions of the coil element 12a. The mandrel 10 is adapted to wind thereon an element-forming material such as a plastic filament 12 so as to give this filament a continuous helical coil configuration A filler cord 13 made for example of a textile material is inserted through the longitudinal space of the filament 12 and moved together therewith upwardly as viewed in the drawing as the filament 12 is wound progressively on the mandrel 10 by a coiling machine (not shown) and taken away by a transport mechanism (not shown). The filler cord 13 is supplied relative to the filament 12 at a constant rate of speed by means of a feeding apparatus 14 embodying the invention. The feeding apparatus 14 is interposed between the mandrel holder 11 and a bobbin 15 storing a predetermined quantity of filler cord 13, and essentially comprises guiding means 16 secured conveniently to the frame of the coiling machine or other suitable stationary supports and rotating means 17 connected to a suitable drive means such as a motor (not shown), both means being interengageable as illustrated in FIG. 2 in a manner hereafter described.

The guiding means 16 which constitutes a part of the feeding apparatus 14, comprises a ring member 18 having a central aperture 19 and a downwardly projecting tapered circumferential ridge 20 formed integrally in the lower face of the member 18. The circumferential ridge 20 is terminated by a portion 21 which is reduced in thickness. Both terminated ends of the ridge 20 are preferably rounded as at 22. There is provided a peripheral recess 23 located midpart of the reduced portion 21 devoid of the ridge 20. A slit 24 is formed in the recess 23 and extends radially therethrough to communicate with the central aperture 19. substantially The rotating means 17, which constitutes another part of the feeding apparatus 14 according to the invention, comprises a disc member 25 having a peripherally toothed roll or gear 26 which is concentric with but smaller in diameter than the disc member 25 and which is dimensioned to fit into the aperture 19 of the ring member 18. The disc member 25 has an upper surface 27 which is toothed coextensively with and substantially at right angles to the toothed gear 26, so that the disc member 25 appears as a whole substantially in the form of a roulette.

An aperture 28 is formed in and extends concentrically through the disc member 25 and the toothed gear 26 in communication with the aperture 19 of the ring member 18. It will be appreciated that the rotating means 17 or disc member 25 is arranged to be movable toward and away from the guiding means 16 or ring member 18.

As shown in FIG. 2, a pair of springs 29 are mounted in diametrically opposed relation on the lower surface of the disc member 25 and adapted to urge the latter normally toward the ring member 18. It is also seen in FIG. 2 that the disc member 25 is peripherally tapered in symmetry with the tapered ridge 20 of the ring member 18. This is a preferred arrangement whereby the filler cord 13 can be more easily loaded into and between the two members 18 and 25 of the feeding apparatus 14 in a manner hereafter described.

Now, with this construction, the operation of the apparatus commences in the following manner. The filler cord 13 is passed into and through the apertures 28 and 19; threaded through the slit 24 of the ring member 18; bypassed around a loop defined along and between the ridge 20 of the ring member 18 and the toothed upper surface 27 of the disc member 25, drawn through the recess 23 of the ring member 18; and threaded through the through-opening 11a of the mandrel holder 11 and through the longitudinal space of the helically wound coil element 12a to advance with the latter. When thus loading the filler cord 13 on the feeding apparatus 14, the ring member 18 and the disc member 25 are coupled together as seen in FIG. 2. The filler cord 13 coming out through the slit 24 is therefore passed around and squeezed between the two members 18 and 25, when the member 25 is retracted away from the member 18 against the bias of the springs 29. The filler cord 13 is thus brought into pressure engagement with the ridge 20, the toothed upper surface 27 and the toothed gear 26. In this manner, rotating the disc member 25 drives the filler cord 13 frictionally in the direction of the arrow. The speed of rotation of the disc member 25 may be adjusted so that the filler cord 13 is fed at a rate corresponding to the rate of coiling and withdrawing the filament 12. Since the feed of the filler cord 13 is thus controlled, the possibility of sagging or overtension of the filler cord 13 during its travel can be substantially eliminated. Another advantage of the apparatus of the invention is that it is built compact and hence can be located conveniently in the vicinity of the mandrel holder 11.

What is claimed is:

1. A method of feeding a filler cord through a coiled slide fastener element being formed by winding a filament about an axis generally coincident with the direction the filler cord is fed through the coiled fastener element, which method comprises the steps of directing the filler cord along a path of longitudinal movement extending from a source of filler cord supply to and along said axis, said path having a loop portion, gripping and engaging the cord at said loop portion of the path to drive the cord longitudinally along said path; and adjusting the rate of driving said cord in accordance with the winding rate of said filament whereby the rate at which the cord is fed through the coiled fastener element corresponds to the rate of formation thereof as established by said winding rate.

2. An apparatus for feeding a filler cord through a coiled slide fastener element being formed by winding a filament about an axis generally coincident with the direction the filler cord is fed through the coiled fastener element which apparatus comprises a guide means having guide surfaces positioned to engage the filler cord and direct said cord along a loop portion of a longitudinal movement path extending from a source of filler cord supply to and along said axis; and drive means positioned in cooperating relation with said guide means to confine the filler cord along said loop portion of the movement path, said drive means being disposed in frictional engagement with the filler cord at said loop portion and rotatable relative to said guide means to drive the cord longitudinally along said path.

3. An apparatus as defined in claim 2 in which said guide means comprises:
   a ring member having a central aperture;
   a peripheral ridge terminated by a reduced portion;
   a recess formed at said reduced portion; and
   a slit extending through said recess radially of said ring members in communication with said central aperture.

4. An apparatus as defined in claim 2 in which said drive means comprises:
   a disc member having a peripherally toothed gear which is concentric with but smaller than said disc and engageable with said guiding means; and
   an upper surface which is toothed substantially at right angles to said gear.

5. An apparatus as defined in claim 2 in which said drive means is provided with a spring for normally urging said rotating means towards said guiding means.

* * * * *